United States Patent [19]

Hathaway

[11] 4,165,523
[45] Aug. 21, 1979

[54] AUTOMATIC SCAN TRACKING USING AN ADDITIONAL SENSING MEANS ON A BIMORPH

[75] Inventor: Richard A. Hathaway, Saratoga, Calif.

[73] Assignee: Ampex Corporation, Redwood City, Calif.

[21] Appl. No.: 668,571

[22] Filed: Mar. 19, 1976

[51] Int. Cl.² .................. G11B 5/52; G11B 21/10; G11B 21/18
[52] U.S. Cl. ..................... 360/77; 360/107; 360/109
[58] Field of Search .................. 360/77, 75–76, 360/84, 90, 130, 128, 113, 107, 109; 310/26, 8, 9

[56] References Cited

U.S. PATENT DOCUMENTS

| 3,126,535 | 3/1964 | Streeter | 360/77 |
| 3,526,726 | 9/1970 | Corbett et al. | 360/113 |
| 3,636,252 | 1/1972 | Kowal | 360/70 |
| 3,787,616 | 1/1974 | Falk et al. | 360/75 |

FOREIGN PATENT DOCUMENTS

| 1130845 | 11/1960 | Fed. Rep. of Germany | 360/77 |
| 2293118 | 11/1975 | France | 360/77 |
| 42-35155 | 6/1967 | Japan | 360/77 |
| 48-38102 | 6/1973 | Japan | 360/77 |
| 49-20208 | 5/1974 | Japan | 360/77 |
| 49-84617 | 8/1974 | Japan | 360/77 |
| 7409513 | 7/1974 | Netherlands | 360/77 |
| 387423 | 6/1973 | U.S.S.R. | 360/75 |

OTHER PUBLICATIONS

IBM Tech. Disc. Bulletin, G.E. Price, Videotape Recorder with Oscillating Head, vol. 12, No. 1, Jun. 1969, pp. 33–34.

Primary Examiner—Alfred H. Eddleman
Attorney, Agent, or Firm—Robert G. Clay; Ralph L. Mossino

[57] ABSTRACT

A magnetic head supported for scanning along tracks of a magnetic medium is mounted on a piezoelectric bender element for movement laterally relative to the tracks as they are scanned. As the head scans a track, the relative position between the track to be reproduced and the head is sensed to determine the tracking position of the heads. A bias control signal is generated by a servo circuit and applied to energize the piezoelectric bender element to position the head relative to the track to maintain the head in the desired tracking position as it scans the magnetic medium.

32 Claims, 6 Drawing Figures

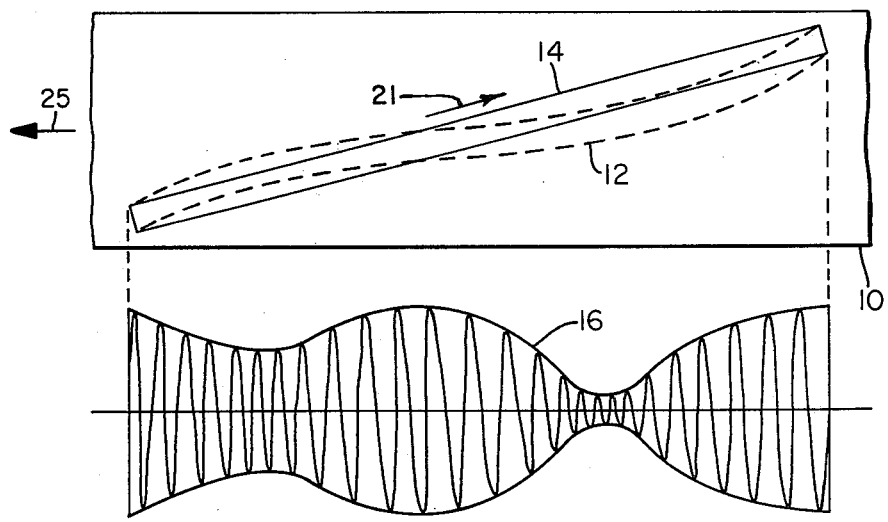
FIG_1
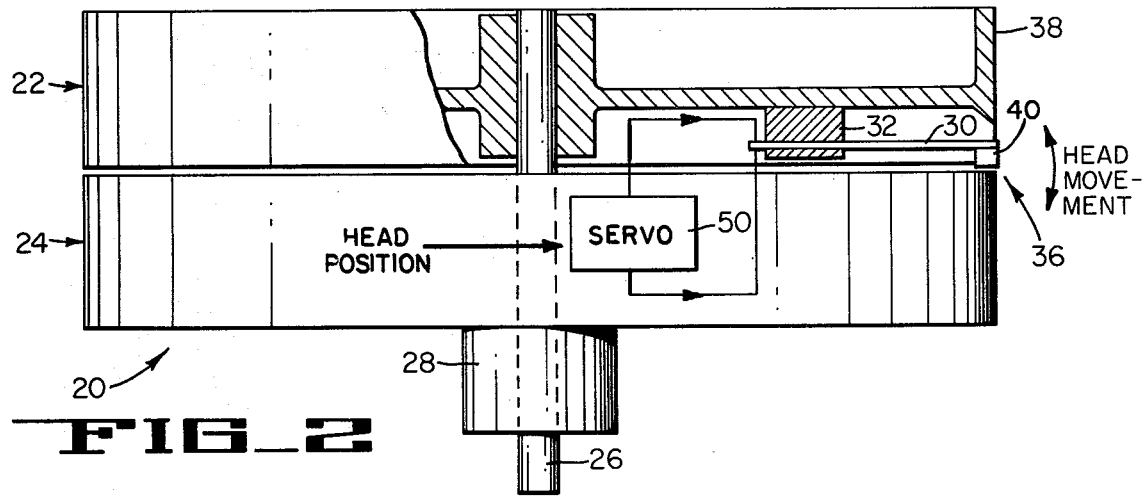
FIG_2
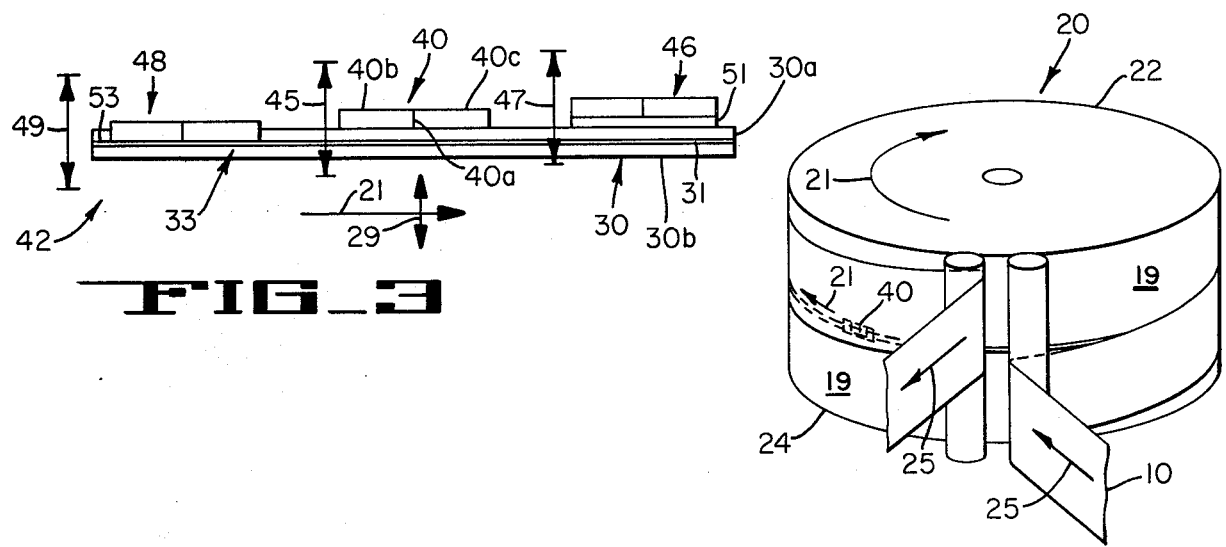
FIG_3
FIG_6

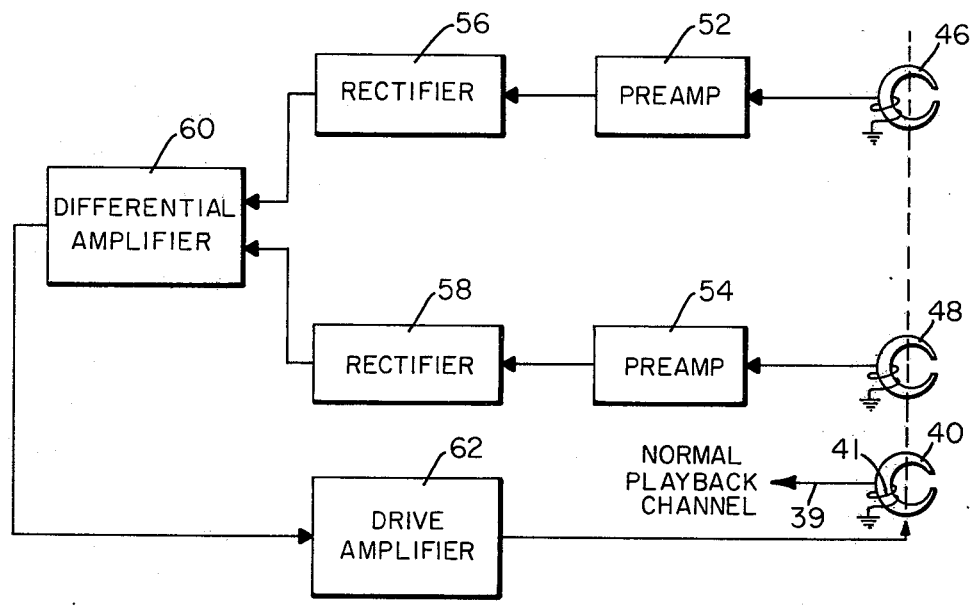
FIG_4
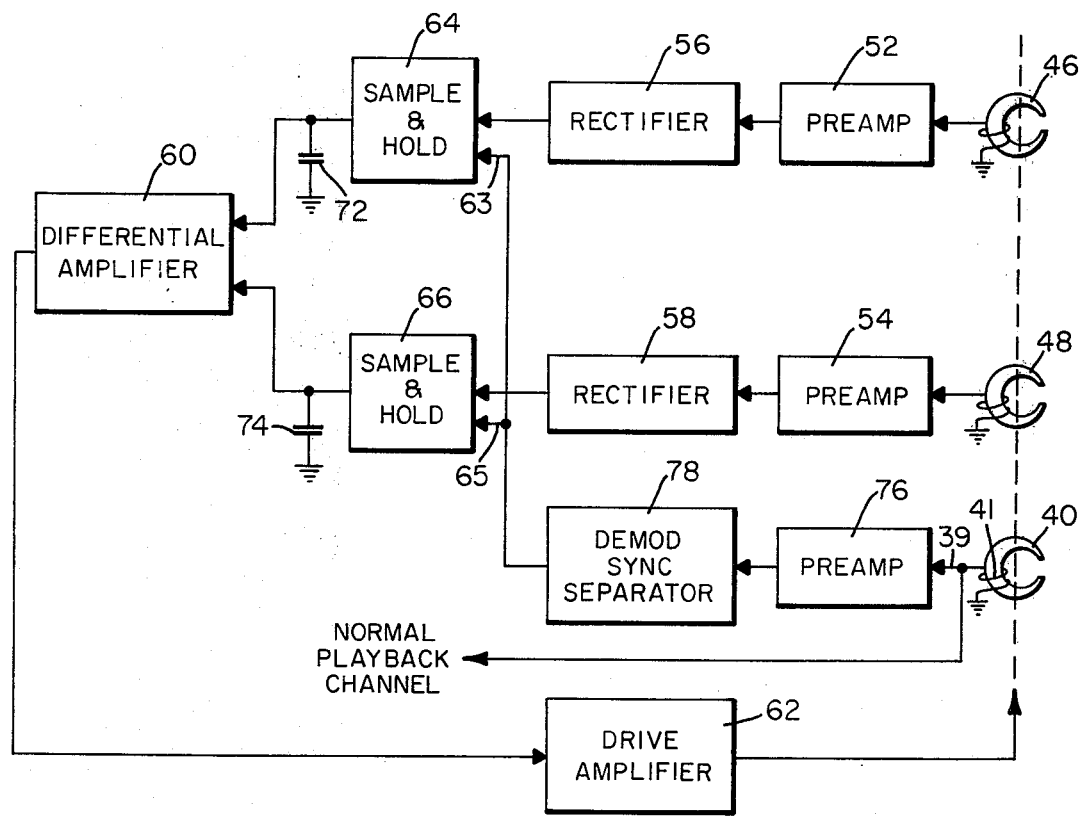
FIG_5

AUTOMATIC SCAN TRACKING USING AN ADDITIONAL SENSING MEANS ON A BIMORPH

BACKGROUND OF THE INVENTION

In magnetic recording/reproducing systems in which data is recorded on a magnetic record medium in a series of discrete tracks, the problems of maintaining a magnetic transducer in the optimum transducing position over each track, i.e., tracking, during the scan of the track has long existed. Imperfect tracking is usually a product of a combination of many factors. Some of the more noteworthy ones are physical instability, irregularities or dimensional changes in the magnetic record medium; differences between the critical tracking-determining dimensions of the machine used to make a recording and those of the machine used to reproduce it; dimensional changes or irregularities in the recording/reproducing machine; and alterations in the track configuration. During data reproduction operations, imperfect or mistracking often leads to non-repeatability of a recorded track and commonly results in the quality of the reproduced signal being degraded severely. The problem is particularly compounded when previously recorded signals must be reproduced track after track where each track may have a slightly different configuration.

Failure to follow or repeat track-by-track exactly a recorded track frequently occurs in helical scan video tape record and/or reproduce machines where a video signal is recorded on magnetic tape in a series of discrete parallel tracks diagonally across the tape by one or more heads. It has often been true that as a reproduce head in a helical machine scans the recorded tracks, the head will deviate substantially from the center line of each track, seriously mistracking, and, thereby, reproducing a degraded form of the recorded signal.

Various systems have been proposed in the prior art to position a magnetic head optimally with respect to a track along a record medium. In U.S. Pat. No. 3,838,453, a system is disclosed to place a scanning magnetic head over the center line of each track of recorded data. Tracking reference signals located at the beginning of each track are detected at the beginning of each scan of a data track. A servo system responsive to the sensed tracking reference signals operates to compensate for an off-track condition by controlling a capstan drive motor to adjust the magnetic tape position relative to the scanning magnetic head. While this system may correctly locate the scanning head relative to the track at the beginning of the track scan, if the track is not perfectly straight or does not follow a predictable path, the scanning head will deviate from the optimum transducing position over the track as it is scanned. Consequently, such systems are not suitable for use in applications, such as in helical scan machines, where tracking corrections must be made during the entire head scan of a track in order to insure that the optimum transducing position is maintained throughout the scan.

Other systems relying upon alteration of the medium transport to control the relative transducer-to-medium position are described in U.S. Pat. Nos. 3,663,763 and 3,748,408. In some of these medium transport control positioning techniques, control track information separately recorded from the data is reproduced to obtain control signals for adjusting the tension of the record medium to maintain proper tracking by the transducer (U.S. Pat. No. 3,748,408). In others of these medium transport control position techniques, data reproduced from the record medium by a transducer whose tracking is to be controlled is monitored to provide a control signal for adjusting the transport of the record medium to maintain proper tracking by the transducer (U.S. Pat. No. 3,663,763). Altering the speed of transport of the record medium has the undesirable tendency of altering the time base of data reproduced from tracks recorded in the direction of the transport of the record medium. Furthermore, techniques which rely upon the control of the transport of the record medium to maintain proper tracking by the transducer are not suitable for precise control of the transducer position relative to paths along the record medium particularly where large displacements (0.05 cm) of transducer/record medium position may be required at high rates (200 deflection cycles per second) to maintain proper tracking by the transducer.

Other systems exist for positioning a magnetic head optimally with respect to a track along a record medium. In U.S. Pat. No. 3,246,307, a reproduce head is positioned over a track prior to reproducing recorded data. This is accomplished by a head composed of two separate magnetic elements. The head is moved until equal signals are reproduced by each element of the reproduce head. At this time, the head is properly positioned and the head positioner relinquishes control to allow normal reproduction of the recorded signal. In U.S. Pat. No. 3,292,168, two sensor heads are located on either side of the reproduce head adjacent to a data track. In a similar fashion as the system described in U.S. Pat. No. 3,246,307, the reproduce head is positioned prior to normal reproduction of the recorded signal by the use of a positioning servo. The positioning servo is stopped when zero error difference is represented by the sensor head signals. Other systems using control tracks and reproduce head vibration have also been employed for tracking purposes. An example of such systems is described in U.S. Pat. No. 3,526,726. However, none of the systems of that kind have provided during with respect to a record medium reproduction of recorded data continuous error-free head positioning along the entire length of a track from head position information derived solely from recorded data. Nor are such systems particularly suited for reproducing a continuous signal from a series of discrete tracks where the tracks are scanned by a transducer rotating at a substantial speed relative to the record medium.

A system for vibrating a magnetic head about its tracking path as it scans a recorded track along a magnetic disc is described in U.S. Pat. No. 3,126,535. As described therein, a fixed frequency oscillator is coupled to provide oscillatory motion to the head. This causes an amplitude modulation of the reproduced data, which is detected and utilized to position the head over the center of a track. That system includes two discrete correction channels, one for each possible direction of head position error and includes means to disable the head positioning mechanism when track center is located. Therefore, this system, too, is primarily concerned with initially locating a transducer with respect to the center line of a data track rather than continuously maintaining optimum transducing position of the transducer during the entire scan of a track. Such systems are suited for use in data record and/or reproduce systems having long term track configuration stability or where the track configuration stability requirements are not critical.

No known automatic scan tracking system is well suited for continuously maintaining a data transducer in optimum transducing relationship with respect to a moving record medium as the transducer scans it at a high speed, such as in a helical scan video tape recorder where the magnetic record/reproduce head or heads are mounted on a rotating assembly. Furthermore, such prior art tracking systems are particularly unsuited for television recording purposes inasmuch as slightest tracking errors cause objectionable effects in the displayed television signal. In other uses, less than correct tracking may provide suitable accuracy for recovering non-visual data. However, complete recovery of datatype information is important and to such extent the present invention is useful in non-visual data recovery systems.

SUMMARY OF THE INVENTION

Accordingly, the present invention comprises a system for automatic transducer tracking in which a data signal transducer is continuously maintained in a desired position with respect to a data or information track. The position of the transducer relative to the data track is monitored through the reproduction of recorded data and continuous correction of undesired positional deviations made by a positionable element. The positionable element comprises a low-inertia transducer deflector mounted to a support element to extend between the support element and the transducer. In one embodiment, the deflector comprises a flexible body that bends to position the transducer in a desired tracking relationship with a record medium. More particularly, the deflector may be an elongated member cantilever supported at one end by the mounting means and holding the signal transducer at the other or free end. Monitoring the position of the signal transducer relative to track center is conveniently accomplished by means of two sensor transducers, preferably situated on either side of the signal transducer to follow paths corresponding to that followed by the signal transducer to sense data recorded on the medium. The deflector provides a support for the three transducers mounted relative to each other in an appropriate manner.

In one preferred embodiment, the deflector is a piezoelectric ceramic bender element which exhibits dimensional changes in the presence of an electric field. The piezoelectric element is constructed of two piezoelectric plates suitably bonded together and cantilevered at one of its ends to support from its other free end the signal transducer in transducing relation with the record medium. The piezoelectric element is cantilevered from the support element so that the bending motion of the piezoelectric element is in a direction lateral to the track with respect to which the transducer is to be positioned. To avoid the introduction of objectionable time base errors to reproduced signals, the signal transducer is placed on the piezoelectric element with its signal coupling path formed with the record medium lateral to the bending motion.

An example of a cantilevered piezoelectric bender element deflector suitable for use with the system of the present invention is described in my copending related application, U.S. Ser. No. 668,651, filed Mar. 19, 1976, for Positionable Transducer Mounting Structure, now U.S. Pat. No. 4,151,569. However, other force-field responsive positionable elements may be used for the deflector, such as electrostrictive, magnetoresistive and magnetically permeable devices, and arrangements other than cantilevered structures are possible.

In one particular embodiment of the present invention for use in a helical scan video tape record and/or reproduce machine, a signal transducer or magnetic head is mounted together with two magnetic sensor heads, one on each side of the signal head. An elongated piezoelectric bender element is cantilever-supported at one end to the rotating head drum of the helical scan machine. The heads are mounted at the free end of the piezoelectric element. The sensor heads are mounted to scan recorded data on the tape along tracks following paths corresponding to the center of the track being scanned by the signal head. This is conveniently accomplished in two ways. The sensor heads can be mounted to overlie either edge of a track to be reproduced. Such sensor heads will then pick up the recorded signal near the guard bands on either side or at either edge of the data track being reproduced. The sensor head may alternatively be mounted to overlie adjacent tracks. In helical scan apparatus, track centers of adjacent tracks closely follow corresponding paths. Circuitry connected to the sensor heads generates a signal having a value related to the difference in amplitude levels of the two signals induced in the sensor heads. This signal yields a direct indication of the lateral position of the signal head with respect to the center of a recorded track of data. More specifically, if the output amplitudes of the signals from the two sensor heads are equal, the signal head is tracking properly; however, if unequal mistracking exists, a representative bias voltage (or error signal) is generated in response to any differences in amplitude between the two signals, hence, degree of mistracking, and is applied to actuate the deflector element to cause it to bend or flex in a direction transverse to the track being scanned by the signal head to overcome any such difference and position the signal head in the proper position over the track. Since the sensor heads are operable during the time the signal head scans the tape to record or reproduce data therefrom, continuous correction is thereby provided to maintain proper tracking even when track configuration deviates from the ideal.

The disclosed embodiment is especially suited to be utilized with the mounting structure disclosed in my above-identified copending application Ser. No. 668,651.

BRIEF DESCRIPTION OF THE DRAWINGS

The invention will be described in greater detail with reference to the drawings in which:

FIG. 1 is a schematic illustration of a problem solved by the invention;

FIG. 2 is a partially cut away view of a helical scan video head drum assembly;

FIG. 3 is an end view of a head support according to the invention; and

FIGS. 4 and 5 are schematic block diagrams of servo circuits according to the invention.

FIG. 6 is a reduced scale view of the magnetic tape of FIG. 1 helically wrapped around a scanning mechanism including the structure of FIG. 2.

DESCRIPTION OF THE PREFERRED EMBODIMENTS

Broadly stated, the present invention is directed to a system for automatic tracking by a record medium scanning transducer in which a data signal transducer is continuously maintained in a desired position with respect to a track of data or information recorded by it on a record medium. However, the features of the invention are particularly advantageous for track segmental recording and reproduction of data magnetic tape by means of one or more magnetic heads rotated at a high speed relative to the tape. While there have been many different recording formats that have been developed, the format in which video or other similarly wideband signals are recorded on magnetic tape as it is transported in a helix around a cylindrically shaped scanning tape guide drum assembly has exhibited many distinct advantages in terms of relative simplicity of the tape transport drive and control mechanism, the necessary electronics, involved, the number of transducing heads, and the efficient use of tape, in terms of the quantity of tape that is required for recording a given amount of material. By helically guiding the tape around a rotating scanning head, a single transducing head for reproducing or playing the information that is recorded on the tape can be utilized. When a single head is used in a helical tape recording apparatus, two recognized alternatives are available for guiding the tape around the scanning head, and are generally referred to as the "alpha" wrap and the "omega" wrap apparatus.

The alpha wrap has the tape introduced from one side and wrapped completely around the drum so that it exits on the opposite side and is referred to as the alpha wrap for the reason that it generally conforms to the Greek symbol alpha (α) when one views the arangement from above. In the omega wrap apparatus, the tape is introduced to the helical path by bringing it toward the drum in a generally radial direction and thereafter passing it around a guide to bring it in contact with the surface of the drum, helically wrapping the tape around the drum and passing it around another guide so that it also exits the drum also in a generally radial direction. The tape generally conforms to the shape of the Greek symbol omega (Ω) when it is viewed from above. Both of these configurations are helical wrapped in that the tape is wrapped around the scanning tape guide drum in a helical manner with the tape exiting the drum surface at a different axially displaced position relative to the entry thereof. In other words, if the drum is vertically oriented, the tape leaves the drum surface either higher or lower than when it first contacts the surface. The video information signals are recorded on discrete parallel tracks that are positioned at an angle relative to the longitudinal direction of the tape so that a track length greatly in excess of the width of the tape can be achieved. The angular orientation of the recorded tracks is a function of both the speed of the tape being transported around the scanning drum as well as the speed of rotation of the scanning head. The resultant angle therefore varies depending upon the relative speeds of both the rotating scanning head and tape being transported.

While the present invention will be specifically described in connection with an omega wrap helical video tape recording apparatus, it is equally applicable to an alpha wrap helical tape recording apparatus. Additionally, while the present invention will be described in conjunction with a 360° omega wrap apparatus (it being undestood that the tape does not contact the scanning drum a full 360° because of tape entrance and exit dimensional requirements), the present invention is also applicable to helical video tape recorders which utilize less than 360° wrap, e.g., a 180° wrap tape path apparatus having more than one head. It should also be understood that the present invention is applicable to arrangements where the scanning head can move in either rotational direction and the tape can be introduced either above or below the exit path and moved around the scanning drum in either direction. The relationships of head rotation, tape transport direction and manner of tape guiding, i.e., introducing the tape above or below the path of its exit, can represent up to eight different configurational relationships of which only one will be specifically described herein as shown by the direction of the arrows 25 in FIG. 6 of the drawings.

In helical scan video tape recorders, the path followed by a magnetic video head transducer as it scans the tape is likely to vary from scan to scan and, during reproduction operations often does not coincide with the track of video data recorded by the transducer. Referring to FIG. 1, a section of magnetic video tape 10 is schematically shown with one track 12 of data (depicted in a dashed line) previously recorded by a helical scan video tape recorder. As previously mentioned, during data recording and reproducing operations, the tape is guided under tension so that recording occurs under a recommended standard value of longitudinal tension, which induces a certain degree of stretching of the tape. If tension variations occur because of faults in the tensioning mechanism, or because of unavoidable variations in the mechanisms of different machines, then the length, straightness and inclination of the track relative to the video head will be different. Under such circumstances, the head will not perfectly follow a defined data track path, which during reproduction operations leads to undesirable variations in the strength of the reproduced signal, such as variations in the amplitude of the RF envelope 16. A similar effect results if the correct tension is maintained, but the tape experiences shrinkage or elongation due to changes in atmospheric or storage conditions, e.g., temperature or humidity. Also, irregular tape edges and differences in edge-guiding effects from machine to machine can cause irregularly wandering tracks or scans. Consequently, the path 14 taken by the video head as it scans the tape 10 often fails to exactly coincide with the desired path for a recorded track 12. In actual practice it has been found that a deviation of 0.0025 cm between the desired path for a recorded track 12 and the path 14 taken by the reproduce head can result in significant deterioration in the quality of the reproduced video signal.

One solution to precise tracking of paths by signal transducers along a record medium is offered by the present invention. Briefly, a magnetic video head signal transducer 40 can be mounted on a separate support comprising a scanning drum carrier for rotation coaxially between two stationary guide drums, most commonly cylindrical. Alternatively, the video head 40 can be carried on a support here shown as a rotatable upper guide drum 22 associated with a stationary lower guide drum 24 as in FIG. 6, the coaxially disposed drums forming a scanning assembly providing a surface 19 for guiding the tape 10. The upper drum 22 is fixed to a driven shaft 26, which is fitted for rotation in a bearing 28 mounted on the lower drum 24 and driven by a motor (now shown) in a known manner. The magnetic tape 10 is helically wrapped (i.e., substantially 360°) around the drums 22, 24 for scanning by the head 40. The tape 10 is guided, tensioned and moved (arrows 25)

by means not shown but well known in the art so that the head 40 carried by drum 22, rotating in direction 21 opposite the direction of tape transport about the guide drums, scans a series of oblique transverse paths 14 of which only one is shown in FIG. 1. It should be appreciated that the head 40 can rotate in the same direction as that of the movement of the tape 10 about the guide drums 20, 22. However, this change in head rotation does not alter the implementation of the present invention.

Head 40 is extremely small and of low mass (on the order of 100 milligrams), and consists of two pole pieces 40b and 40c confronting one another across a non-magnetic transducing gap 40a for recording and/or reproducing signals with respect to the tape 10 (see FIG. 3). The gap 40a is aligned with the length thereof substantially parallel to the direction 21 of drum 22 movement relative to the tape 10. It will be understood that in the magnetic recording art the "length" of the gap is the dimension from pole face to pole face, in the direction of relative recording motion. Usually, the "width" of gap is aligned transversely to the relative motion direction and parallel to the recording surface, and the "depth" of the gap is normal to the recording surface. If for any reason the gap is inclined to the direction of relative motion, the length is still defined (at least for purposes of this invention) to be in the direction of relative motion, while the width and depth dimensions are still taken as being orthogonal to the length. Signals are carried to or from the head 40 by means of pole piece windings 41 and lead 39. (See FIGS. 4 and 5). Signals are coupled between the magnetic head 40 and the recording surface passing the gap 40a through a coupling path that extends between the two pole pieces 40b and 40c through the recording surface in the direction of relative motion, hence the desired track on the surface.

To provide for tracking movement of the head 40 transverse (arrows 29 in FIG. 3) to the direction 21 of the drum 22 movement, the head is mounted or bonded, as by epoxy to one flat side of a positionable element 30, here shown by way of example as a piezoelectric ceramic bender element. It will be seen from FIG. 2 that the head 40 is fitted to the upper rotating drum 22. The piezoelectric bender element 30 is elongated and is mounted at one end in a cantilever support element 32 fixed to upper drum 22. As will be more particularly described later, the bender element bends in response to an applied voltage in a well known manner in directions transverse to track 12 to deflect the video head 40 lateral to the track 12. Support 32 may be constructed in any suitable manner such as from machined aluminum and may be attached to drum 22 by screws, or other means. The support must be electrically insulated from deflector 30 when a piezoelectric ceramic bender is used as the deflector.

While the details of the particular construction of the positionable element 30 are the subject of and are described in my above-mentioned co-pending application, a brief description will be included herein to facilitate understanding the present invention. The piezoelectric ceramic bender element 30 is constructed of two layers 30a and 30b of piezoelectric ceramic material bonded together in a known manner to an intervening brass vein 31. The element is elongated and significantly wider than thick. For cantilevered positionable elements, a length-to-width aspect ratio of 2:1 and a thickness on the order of 3% of the width provides the desired deflection characteristics. The axes of polarization of the two piezoelectric layers are oriented with respect to one another so that, when a voltage is applied across the bonded layers, one layer is caused to expand and the other to contract in a known manner. The device is thereby caused to flex or bend. The amount of movement depends on the voltage applied across the layers of piezoelectric material. Piezoelectric ceramic benders are available from a number of manufacturers. For example, benders manufactured by Vernitron Corp. and identified as PZT-5HN Bender Bi-Morph Poled For Parallel Operation or by Gulton Industries and identified as G 1278 Piezoceramic Bender Element Poled For Parallel Operation may be used.

In addition to the video head 40, a pair of left-offset and right-offset track sensing magnetic heads 46 and 48 are mounted on the bender element 30 at the free end 33. These sensor heads 46 and 48 are employed to monitor continuously the lateral track position of the single magnetic video head 40 and provide information that is used to control the lateral position of the video head 40. The track sensing heads 46 and 48 are, in this embodiment, mounted on either side of the video head 40, but are oppositely staggered transversely to the direction of motion 21, so as to sweep, respectively, left-offset and right-offset zones 47 and 49 that overlap the middle zone 45, which corresponds to the expected range of track displacement of the video head 40. As shown in FIG. 3, the video head 40 is mounted directly on the surface of the bender element 30 for sweeping a range of displacements represented by middle zone 45. Left-offset track sensing head 46 is mounted on a spacer element 51 fastened to the surface of the bender element 30. The thickness of the spacer 51 is less than the width of the video head 40 so that the sensing head 46 is spaced above the head 40 by an amount less than the width of the head 40. Right-offset track sensing head 49 is mounted on a recessed mounting shelf 53 provided by cutting away the bender element 30 at a corner. Mounting shelf 53 is recessed below the surface of the bender element 30 a distance equal to the thickness of the spacer 51 so that the sensing head 48 is spaced below the video head 40 by an amount less than the width of the head 40.

The magnetic heads 40, 46 and 48 are shown in FIG. 3 as they schematically appear from the surface of the tape 10, each with the width of its transducing gap (see 40a of video head 40) lateral and substantially perpendicular to the magnetic track path that extends along the recorded track 14. When the video head 40 overlies the track to be reproduced, the sensor heads 46, 48 may overlie the edges of the same track, the guard bands on either side of the track to be reproduced or the adjacent tracks. Since physical and electrical limitations on head size prevent many known heads from being placed side by side, they are shown offset with respect to one another. Other arrangements of the video and sensor heads are possible such as placing both sensor heads to the right or left of the video head as seen. It is desirable that the sensor heads be placed on the head mount in such a way that when the video head is properly following the center line of the track being reproduced, the amplitudes of the sensor head outputs are equal.

Video head 40 may be any known head used in the video recording/reproducing art. Since the sensor heads 46, 48 need only provide a signal from which the amplitude of the video envelope can be determined, they need not be the same quality or type as video head 40. But, it is preferable that sensor heads be of good quality to insure the most accurate position location information is obtained.

In the embodiment of FIG. 3, the paths scanned by the sensor heads always overlap the edges of the path scanned by head 40 as it is displaced through the expected range 45 of track displacement. In the event the path scanned by the head 40 is a recorded track of data, the sensor heads 46, 48 reproduce data from the overlapped edges of the recorded tracks as they follow the record/reproduce head 40. Alternatively, the sensor heads 46, 48 may be made narrower in width (i.e., lateral to direction of motion 21) than head 40, so as to have less overlap upon the path scanned by head 40, or even zero overlap. However, the sensor heads 46, 48 preferably do not extend laterally beyond the dimension of the guard banks flanking the recorded track, when the head 40 is correctly following the track, and thus sensor heads 46, 48 do not ordinarily read parts of adjacent tracks. In any case, the heads 40, 46, and 48 are supported by the drum 22 so they slightly project beyond the outside surface 38 of the scanner 20 to insure proper tape to head interface. To afford clearance for the displacement of the head assembly 42, it may be necessary to provide an enlarged opening 36 in the carrier drum 22. Furthermore, it is desirable that the sensor heads be placed on the head mount in such a way that when the video head is properly following the center line of the track being reproduced, the amplitudes of the sensor head outputs are equal. While a positionable element and support for one video head has been shown, the present invention can be employed to position a plurality of video heads, whether separately mounted upon separate positionable elements or on one positionable element.

Referring to FIG. 2, a servo circuit 50 is connected to receive head location information from the sensor heads 46, 48 and to apply an appropriate bias voltage to bimorph 30 to maintain the video head 40 at a desired lateral location within the data track being reproduced. Leads (shown schematically in FIGS. 4 and 5) from sensor heads 46, 48 carry the location information to circuit 50 and corrective information thence to the bender element 30. Such leads may run down one face of the bender element 30 to connect directly to the servo circuit 50, if the circuit is mounted on the rotating upper drum, or alternatively, they may connect by way of slip rings or rotary transformers if the servo circuit 50 is mounted elsewhere. The leads from the servo circuit 50 may be physically attached to conductive members of the bender element 30 by dots of epoxy.

As noted previously, in response to the head position information, circuit 50 adjusts a bias voltage, which is applied across the bender element 30 to cause the free end to bend and laterally position the video head 40 in the data track. The contacts for applying the bias voltage across the bender element 30 may be constructed in any known way for applying a voltage to a piezoelectric element, one of which is described in the above-mentioned co-pending application. For example, conductive metal plates could be bonded to the outer surface of each piezoelectric ceramic layer and the leads attached by dots of solder. Since the bender element 30 must bend in a direction generally normal to its length/width plane, the two bias voltage connections are made to the bender element 30 near the supported end. Those skilled in the art will appreciate that an important feature of the present invention is the continuous tracking of a data track and adjusting the position of a signal transducer with respect to a track while that track is being reproduced. With respect to the this specification, "continuous" tracking and/or adjusting of the position of a transducer means that tracking and adjusting never ends and, therefore, it does not include periodically tracking and/or adjusting during the scan of a track.

One example of a circuit 50 for maintaining proper video head tracking is shown in FIG. 4. During reproduction, the two sensor heads 46, 48 reproduce signals from opposite edges of a track being reproduced, such as track 12 in FIG. 1. The signal reproduced by each sensor head consists of the RF video signal recorded on tape. The instantaneous amplitude of the signal reproduced by either head depends on how closely it overlies the recorded track at any instant in time. If the sensor head completely overlies the guard band, the signal level will be very small; however, if it overlies a substantial portion of the recorded track, the signal level will be higher.

Each sensor head 46, 48 is connected to a preamplifier 52, 54 so that the reproduced RF video signals are amplified. The amplitude levels of the RF video signals provided by the preamplifiers 52, 54 are detected by rectifiers 56 and 58. The output of each rectifier is then connected to a differential amplifier 60 in which the rectified amplitude levels are compared to develop an error voltage proportional to the tracking error. The provided output difference signal amplitude is proportional to the difference in the average amplitudes of the signals provided by the sensor heads 46 and 48 and its sense is representative of which of the average amplitudes is the largest. When the head 40 is located in the proper track position at the center of the track 12, the average amplitudes of the signals reproduced by the sensing heads 46, 48 are equal. Thus, the output signal of the difference detector will be zero, or correspond to the desired track position for head 40. However, as the video head 40 is displaced from track center in the direction of the left-offset track sensing head 46 (see FIG. 3) the average amplitude of the signal envelope reproduced by the sensing head 46 proportionately decreases while that reproduced by the right-offset track sensing head 48 proportionately increases. The contrary occurs as the record/reproduce head 40 is displaced from track center in the direction of the right-offset track sensing head 48, i.e., the average amplitude of the signal envelope reproduced by the sensing head 48 proportionately decreases while that reproduced by the sensing 46 proportionately increases. Thus, the servo circuit 50 is responsive to such proportionately changing signals to generate a difference error signal whose amplitude follows the amplitude difference of the signal envelopes reproduced by the sensing heads 46, 48 and whose sense is dependent upon which of the signal. The error voltage output is connected to a drive amplifier 62 and the output of drive amplifier 62 is applied as a bias voltage to the bender element 30.

As previously disclosed, the sensor heads 46, 48 and the video head 40 are mounted on the free end of the bender element 30. The bender element is caused to bend or deflect transverse to the track being reproduced by an amount determined by the amplitude and sense of the bias voltage applied to it until a zero voltage difference exists between the sensor head outputs. At the time of such zero voltage difference, the head 40 is positioned at a desired lateral position within the track, such as track center and continues thusly along the length of the track until a further difference is detected and corrective drive applied to the bender element 30.

The RF video envelope may contain some amplitude modulation resulting from the video modulating signal, which modulates a carrier for recording on a magnetic medium. Erroneous tracking can result from such modulation. Modifications to the circuit of FIG. 4 may be made to avoid such errors and are shown in FIG. 5. Connected between the output of each rectifier 56, 58 and the inputs of differential amplifier 60 are sample and hold circuits 64, 66 with associated holding capacitors 72, 74 being connected between the respective sample and hold circuits and ground. The output of video head 40 is connected to a preamplifier 76, the output of which is in turn connected to a demodulator sync separator 78, which conventionally operates at the video horizontal line rate to separate out the horizontal synchronization (sync) pulse from the reproduced video signal. The horizontal sync pulse output of sync separator 78 is applied to the control terminals of sample and holds 64, 66 to cause them to sample the tracking information during the horizontal sync pulse interval. This results in the output of the sensor heads 46, 48 being periodically sampled at horizontal line rate for the entire scan of track 12. Sampling in this manner eliminates possible AM interference with the tracking error information because frequency modulation for recording does not effect the sync pulse. The circuit is otherwise identical to FIG. 4.

The operation of the invention is as follows. A video tape 10 is wrapped around drum 20 in a known fashion. Upper drum 22 rotates at a high speed carrying the head assembly 42 mounted thereto by a positionable element 30 so that the video head 40 scans a recorded track on the tape for reproduction. The positionable element 30 bends, deflects or is otherwise displaced in a direction lateral to a track.

Sensor heads 46, 48 sense the video head position, preferably by sensing opposite edges of the track being reproduced. The amplitude level of the video signals reproduced by sensor heads 46, 48 are detected by rectifiers 56, 58 and compared by differential amplifier 60 to produce a tracking correction signal. The correction signal is amplified by drive amplifier 62 to produce a bias voltage. This bias voltage is applied to the bender element 30 to cause it to bend to maintain the amplitude of the signals reproduced by the sensor heads at correct tracking levels. Video head 40 is thereby made to correctly track the track.

For a more particular understanding of the scope of the invention, reference is made to the appended claims.

I claim:

1. In a record/reproduce device having signal transducer means supported by mounting means for transducing data recorded along tracks on a record medium, comprising: an elongated positionable element extended between the mounting means and the transducing means for displacement of the transducing means in a generally transverse direction relative to the lengthwise direction of a subject track, sensing means mounted on said element adjacent the transducer means for continuously sensing two edges of one or more recorded tracks and developing a signal indicative of the lateral position of the transducer means with respect to said subject track during transduction of data with respect to said track for effecting transverse displacement of the transducer means with respect to said subject track during said transduction of data.

2. The device of claim 1 further comprising means coupled between the sensing means and positionable element and responsive to the transducer location indicative signal for effecting the lateral displacement of the transducer means.

3. The device of claim 1 in which said positionable element includes deflectable element supporting said transducer means for transverse displacement with respect to the track.

4. The device of claim 3 in which said positionable element comprises a piezoelectric element.

5. The device of claim 3 in which said positionable element is a piezoelectric bender element.

6. The device of claim 5 in which said piezoelectric bender element is elongated and defines two ends, one of said ends is mounted to a cantilever support at the mounting means and the other end is free to support the transducer means for transverse displacement, and said sensing means is physically coupled to the piezoelectric bender element.

7. The device of claim 6 in which said sensing means comprises a pair of sensor transducers mounted at the free end of the piezoelectric bender element for detecting the edges of the track with respect to which data is being transduced.

8. In a data recording and/or reproducing system in which information is recorded in a series of discrete tracks extending generally across the width dimension of a record medium; signal transducer means for reproducing the recorded data, a positionable element for supporting the signal transducer means in transducing relation with respect to a subject recorded track being reproduced, said positionable element being adapted to laterally move the supported signal transducer means with respect to said recorded track, sensing means mounted on said element adjacent said signal transducer means and comprising a pair of sensor transducers for detecting two edges of one or more of said recorded tracks, at least one edge being an edge of said subject track being reproduced, said sensing means developing during the reproduction of data from each subject track a signal indicative of the lateral location of the signal transducer means with respect to said subject recorded track, and means coupled between said sensing means and said positionable element and responsive to the indicative signal for laterally displacing the signal transducer means with respect to said subject track being reproduced.

9. The system of claim 8 in which the signal transducer means includes a magnetic head, the positionable element is fixed to a rotatable member so that the magnetic head is proximate a cylindrical guide surface coaxially disposed with respect to the rotatable member, and the record medium is helically wrapped around the guide surface to be scanned by the magnetic head.

10. The device of claim 8 wherein the servo means is periodically responsive to the indicative signal for effecting the lateral displacement of the transducer means.

11. In a data recording and/or reproducing system in which information is recorded in a series of discrete tracks laterally extending across the width dimension of a record medium; a reproducing transducer, a scanner assembly carrying the reproducing transducer for scanning each track along its length, a positionable element extended between the scanner assembly and reproducing transducer for supporting the reproducing transducer in transducing relation with respect to a recorded track being reproduced, said positionable element displaceable for lateral movement of the supported reproducing transducer with respect to the lengthwise direction of said track, sensing means supported by said element adjacent said reproducing transducer and comprising a pair of sensor transducers in transducing relation with opposite edges of said recorded track being reproduced when said reproducing transducer is centered on said track being reproduced so as to be in optimum transducing relation with respect thereto, said sensing means developing during the reproduction of data a signal indicative of the lateral location of the reproducing transducer with respect to the recorded track, and circuit means coupled between said sensing means and said positionable element and responsive to the indicative signal for lateral displacement of the reproducing transducer with respect to the track being reproduced.

12. The system of claim 11 wherein the positionable element comprises an elongated deflectable element cantilever mounted to the scanner assembly at one end, the other end is free to support the reproducing transducer for lateral displacement.

13. The system of claim 12 wherein the deflectable element comprises an elongated piezoelectric bender element.

14. The system of claim 9 wherein said pair of sensor transducers mounted to said positionable element for detecting opposite edges of the track with respect to which data is being reproduced respectively provide first and second signals, each being indicative of the lateral location of the respective sensor transducer with respect to its associated edge of the track.

15. The system of claim 14 wherein said circuit means comprises a comparator connected to compare the first and second indicative signals, and actuator means coupled between the comparator and the positionable element for lateral displacement of the positioning element in accordance with the comparison of the indicative signals.

16. The system of claim 15 wherein the comparator comprises a rectifier connected to each of the sensor transducers to rectify the outputs reproduced thereby, and a difference comparactor coupled to compare the rectified outputs.

17. The system of claim 16 in which the comparator further includes a sample and hold circuit having control terminals connected between each of the rectifiers and the difference comparator, and a sync separator means connected between the reproducing transducer and each of said sample and hold control terminals to effect sampling of said rectified output during a known sync interval.

18. The system of claim 11 in which the reproducing transducer includes a magnetic head, the piezoelectric bender element is fixed to a rotatable member so that the magnetic head is proximate a cylindrical guide surface coaxial disposed with respect to the rotatable member, and the record medium is helically wrapped around the guide surface to be scanned by the magnetic head.

19. A method of continuously tracking a recorded track along a record medium with a reproducing transducer moving with respect thereto, said transducer being mounted on a rotating drum including the steps of: sensing the location of the transducer with respect to a track being reproduced during rotation of the drum by sensing opposite edges of the track being reproduced, and displacing the transducer in the axial direction relative to the drum and thus generally laterally relative to the track in response to the location sensing as the transducer rotates.

20. A method of tracking a recorded track along a record medium with a reproducing transducer operatively attached to a cylindrical drum that is rotating with respect to said medium, including the steps of: rotating the drum and transducer to scan a track, sensing the location of the transducer with respect to a track by sensing two edges of one or more recorded adjacent tracks, and moving the transducer axially relative to the drum and thereby displacing the transducer laterally relative to the track in response to the location sensing as the transducer scans the track.

21. A method of continuously tracking discrete parallel tracks of data recorded along a record medium helically wrapped about a cylindrical drum having a reproducing transducer attached thereto, said drum and transducer rotating with respect to the helically wrapped record medium including the steps of: sensing the location of the reproducing transducer with respect to a track as the record medium moves helically about said rotating drum using two sensing transducers located adjacent said reproducing transducer, wherein each of said sensing transducers senses one edge of one or more adjacent tracks, and displacing the transducer laterally relative to the track and axially relative to said drum in response to the location sensing as the transducer scans the track.

22. A method of continuously tracking discrete parallel tracks of data recorded along a record medium with a reproducing transducer attached to a cylindrical drum rotating with respect to said medium to reproduce data recorded along said tracks, including the steps of: sensing the location of the transducer with respect to a track during rotation of said drum and transducer using two sensing transducers located adjacent said reproducing transducer, wherein each of said sensing transducers senses one edge of said track being reproduced, and displacing the transducer lateral to the track in response to the location sensing as the transducer reproduces data from the track.

23. A method of continuously tracking discrete parallel tracks of data recorded along a magnetic record medium helically wrapped about a cylindrical guide surface with a reproducing transducer rotating with respect thereto to reproduce recorded data including the steps of: sensing the location of the transducer with respect to a track being reproduced as the magnetic record medium moves helically about the guide surface by sensing the opposite edges of the track being reproduced, and displacing the transducer in an axial direction relative to the guide surface and generally lateral to the track in response to the location sensing as the transducer reproduces data from the track.

24. The method of claim 23 including the further step of rotating the transducer to scan the track as its location is sensed.

25. A magnetic recording/reproducing machine having a record and/or reproduce magnetic head supported by a rotatable mounting means for scanning the magnetic head along tracks on a magnetic medium, comprising deflection means extending from the mounting means for holding the magnetic head in a transducing relationship with the magnetic medium as it is scanned along the tracks and for movably positioning the transducer means generally transversely relative to the lengthwise direction of the track being scanned, and means for sensing the lateral location of the magnetic head with respect to the track being scanned, said sensing means comprising a pair of sensor magnetic heads mounted in transducing relationship with the opposite edges of the track being scanned when the record and/or reproduce magnetic head is at the center of the track.

26. The machine of claim 25 wherein deflector means comprises an elongated element cantilever mounted to said mounting means at one end and having said magnetic heads mounted on the other free end.

27. The machine of claim 26 wherein the elongated element includes a piezoelectric bender element.

28. A helical scan video tape record/reproduce machine for transducing video data with respect to discrete tracks extending across a magnetic tape, comprising: a cylindrical guide defining a surface about an axis, the surface serving to support magnetic tape wrapped helically thereabout, a magnetic video head for scanning the tracks, means for rotating the magnetic video head about an axis coaxial with the axis of the cylindrical guide surface for scanning a track, a positionable element attached to the rotating means and carrying said magnetic video head and adapted to displace the magnetic video head laterally relative to the track and axially relative to said cylindrical guide, and sensing means operatively associated with the magnetic video head for developing a signal indicative of the lateral location of the magnetic video head with respect to the track during the scanning thereof, said sensing means comprising a pair of sensor magnetic heads mounted in transducing relationship with the opposite edges of the track being scanned when the video head is at the center of the track.

29. The machine of claim 28 further comprising circuit means coupled between the sensing means and the positionable element and responsive to the indicative signal for lateral displacement of the magnetic head with respect to the magnetic head with respect to the track being scanned.

30. The machine of claim 29 wherein said positionable element includes a piezoelectric bender element.

31. The machine of claim 30 wherein the piezoelectric bender element is elongated and defines two ends, one of said ends being mounted to a cantilever support at the rotating means and the other end being free to support the magnetic head for lateral displacement, and said sensing means being coupled to the piezoelectric bender element.

32. In a record/reproducing device having signal transducer means supported by mounting means for transducing data recorded along tracks on a record medium, comprising: an elongated positionable element extended between the mounting means and the transducing means for displacement of the transducing means in a generally transverse direction relative to the lengthwise direction of a subject track, sensing means for continuously sensing opposite edges of said subject track and developing a signal indicative of the lateral position of the transducer means with respect to said subject track during transduction of data with respect to said track, and means for coupling said signal to said element for effecting transverse displacement of the transducer means with respect to said subject track during said transduction of data.

* * * * *